Nov. 1, 1927.

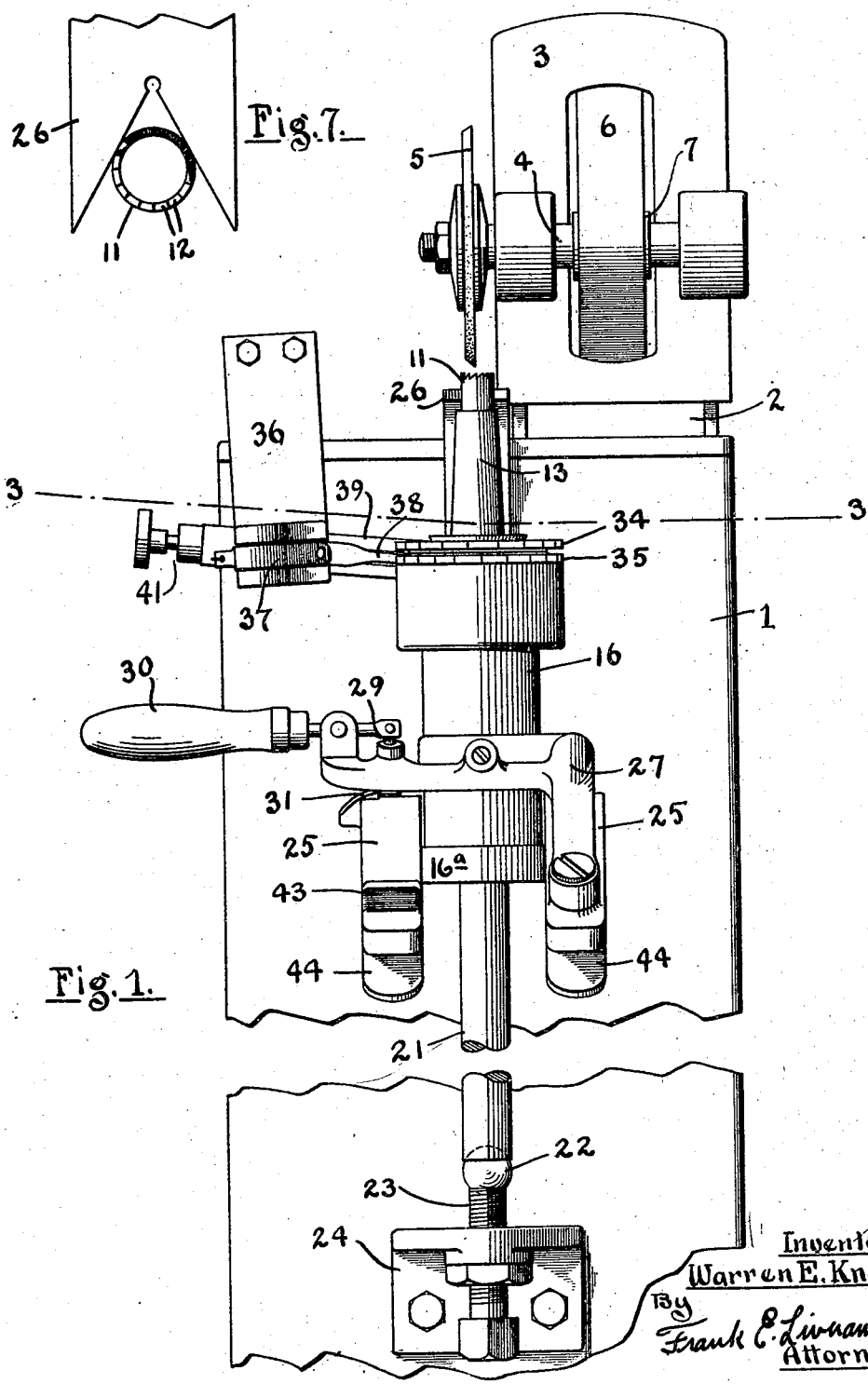

W. E. KNOTT 1,647,366

SAW GRINDER

Filed Nov. 26, 1926 — 3 Sheets-Sheet 2

Inventor
Warren E. Knott
By Frank E. Liverance, Jr.
Attorney.

Nov. 1, 1927.  
W. E. KNOTT  
SAW GRINDER  
Filed Nov. 26, 1926  
1,647,366  
3 Sheets-Sheet 3

Inventor  
Warren E. Knott.  
By Frank E. Liverance, Jr.  
Attorney.

Patented Nov. 1, 1927.

1,647,366

UNITED STATES PATENT OFFICE.

WARREN E. KNOTT, OF GRAND RAPIDS, MICHIGAN.

SAW GRINDER.

Application filed November 26, 1926. Serial No. 150,729.

This invention relates to saw grinders and particularly to an automatic grinder for sharpening cylindical saws.

The saws to be sharpened by this device are of hollow cylindrical or tubular shape, the teeth being provided at one end of the cylinder and the cylinder is mounted in a mandrel adapted to be received by the chuck of the machine in which the saw is used. The saws are particularly adapted for cutting disks out of material, such as button blanks out of shells or analogous objects.

The principal objects of the invention are to provide a saw grinder which will rapidly and accurately automatically sharpen the teeth of a saw of this character. The machine is provided with means for quickly receiving the saw, means for accurately locating it relative to the grinding wheel, means for automatically acting upon saws having different numbers of teeth, means for quickly changing the machine to act upon saws of different numbers of teeth, means for quickly inserting and removing the saw, and various other novel features of construction and arrangement as are hereinafter more fully described and particularly pointed out in the claims, reference being had to the accompanying drawings, in which:

Fig. 1 is a partial front elevation with parts broken away of a machine embodying this invention.

Fig. 7 is an enlarged fragmentary plan of the saw guide and saw.

Like reference characters refer to like parts in the different figures of the drawings.

Figure 3:
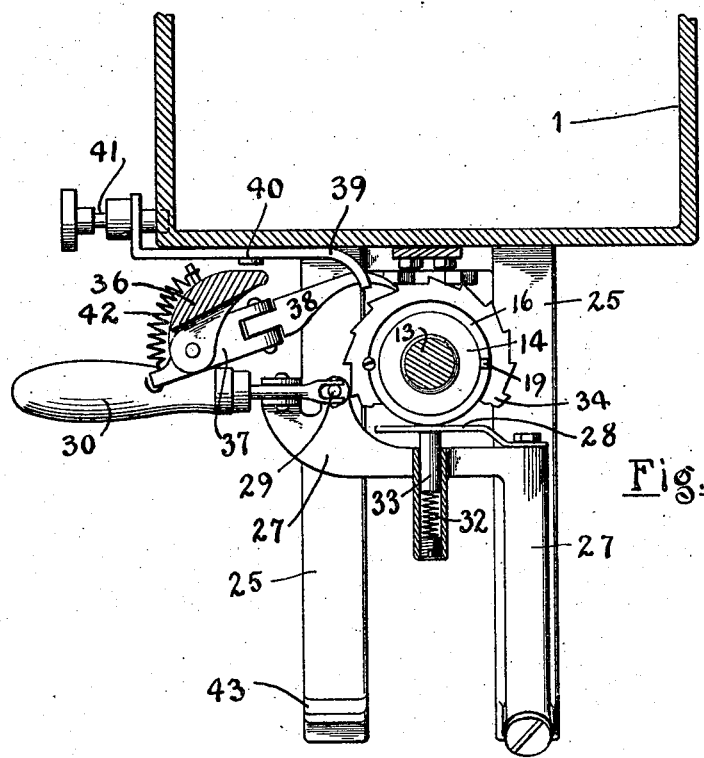
Fig. 3 is a sectional plan on the line 3—3 of Fig. 1.
Figure 4:
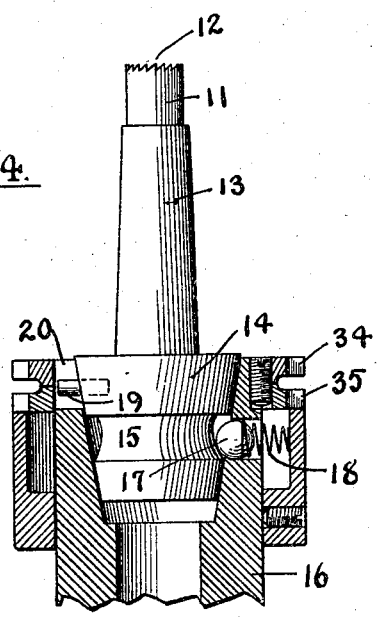
Fig. 4 is a sectional detail of the upper end of the chuck.
Figure 5:
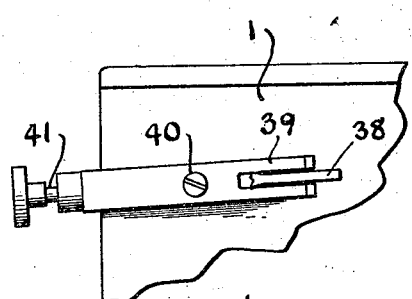
Fig. 5 is a fragmentary detail of the pawl shifting device.

The mechanism embodying this invention is designed to be applied to the saw grinding machine disclosed by Patent No. 1,401,696, dated Dec. 27, 1921, and utilizes parts of said machine without change. The machine shown by said patent includes a frame 1 on the top of which is a vertical guideway 2 provided with a vertically reciprocable head 3 on which is mounted a grinding wheel shaft 4 carrying the grinding wheel 5 rotated by a belt 6 passing over a pulley 7. The head 3 with the grinding wheel is caused to reciprocate vertically by mechanism within the frame 1, not shown in the present drawings, the connection with such mechanism being by means of the rod 8 which is connected to the head 3 by the lug 9. The rod 8 is adjustable to raise or lower the head 3. The patented machine also has an oscillating arm 10 projecting through the top of the machine and oscillating in synchronism with the reciprocation of the head 3. The mechanism for oscillating the arm 10 is disclosed by the said patent but is not shown by the present drawings as it forms no part of the present invention.

The cylindrical saw 11 has teeth 12 in one of its ends and is mounted at its other end in a mandrel 13 which has a tapered head 14. The tapered surface of the head 14 is provided with an annular groove 15 which receives means in the chuck of the sawing machine to retain it. Analogous means are provided in the chuck 16 of this grinding machine, comprising balls 17 thrust inwardly by springs 18, the balls 17 engaging the inwardly tapered bottom of the groove 15 to hold the tapered head 14 snugly in the tapered recess in the end of the chuck 16. A pin 19 extends laterally from the tapered surface of the head 14 and is received in a slot 20 in the end of the chuck 16. This pin prevents rotation of the mandrel relative to the chuck.

The chuck 16 is mounted on the upper end of the shaft 21, the lower end of which is supported for universal movement upon a ball 22, the ball being supported by an adjusting screw 23 threaded into a bracket 24 which is fixed to the front side of the frame 1 of the grinding machine.

When in operating position the shaft 21 and the chuck 16 are arranged in substantially vertical position at the front of the machine beneath the grinding wheel 5, the axis of the chuck and shaft being located forward of the axis of the grinding wheel and shaft for the purpose to be hereafter specified. The chuck 16 is guided to its approximately correct operating position by the forked arcuate member 25, the curve of this member having its center at the ball 22.

It is to be noted that the forked member 25 only approximately guides the chuck and that the chuck fits loosely between the forked members. The saw is accurately located in its operating position by the guide 26 which has a V-shaped opening in its forward edge. The guide 26 is located relatively close to the periphery of the grinding wheel 5 and its V-shaped recess receives the saw close to the teeth thereof. When the saw is engaged and located by the guide 26 it is intended that the chuck is not to be engaged by the forked member 25.

The chuck and saw are held in operative position by a pivoted arm 27 mounted on the forked member 25 and provided with a spring 28 to engage the cylindrical surface of the chuck. A latch, comprising the latch bolt 29 and the handle 30, is provided on the lever 27 and a detent 31 on the forked member 25 which hold the arm 27 in position to engage the spring 28 with the chuck and yieldably move the chuck so that the saw will be held snugly in the guide 26. An auxiliary spring 32 acting upon a plunger 33 aids in pressing the spring 28 against the chuck.

The operation of the machine in grinding the saw is automatic and in performing its operation the grinding wheel 5 is caused to raise and lower intermittently, coming in contact with the saw teeth at its lower position and while the grinding wheel is in raised position it is necessary to rotate the saw the distance of one tooth. The step-by-step rotation of the saw is accomplished by means of a pawl acting upon a ratchet wheel. The teeth in the ratchet wheel correspond in number with the teeth of the saw and inasmuch as this machine is adapted to operate upon saws having different numbers of teeth, two such ratchet wheels 34 and 35 are provided, each having a different number of teeth. The oscillating arm 10 is provided with a bracket 36 rigidly attached to it and this bracket overhangs the side of the machine and is provided at its lower end with a lever 37 pivoted in a horizontal plane at the approximate elevation of the ratchet wheels 34 and 35. A pawl 38 is pivoted in a vertical plane to the end of the lever 37 and a forked guide 39 embraces the pawl 38 near its free end and guides it in engagement with one of the ratchet wheels 34 and 35. The forked guide 39 is pivoted at 40 to the front side of the frame and has a latch 41 engageable with the frame to retain the guide in either of two positions to which it may be turned. In one of these positions the pawl is guided into engagement with the upper ratchet wheel 34 and in the other position with the lower ratchet wheel 35. As the arm 10 oscillates the pawl 38 is moved backward and forward guided in the forked end of the guide 39 into engagement with one or the other ratchet wheels. The pivoting of the pawl 38 in one plane and the lever 37 in another plane permits a universal movement of the pawl and a spring 42 attached to the bracket 36 and to the lever 37 retains the pawl in engagement with the ratchet wheels.

It is to be understood that each saw is permanently fixed to its mandrel and each saw is provided with its own mandrel, and although the saws may be of different diameters and have different numbers of teeth the heads of the mandrels are all uniform.

Figures 2, 6:
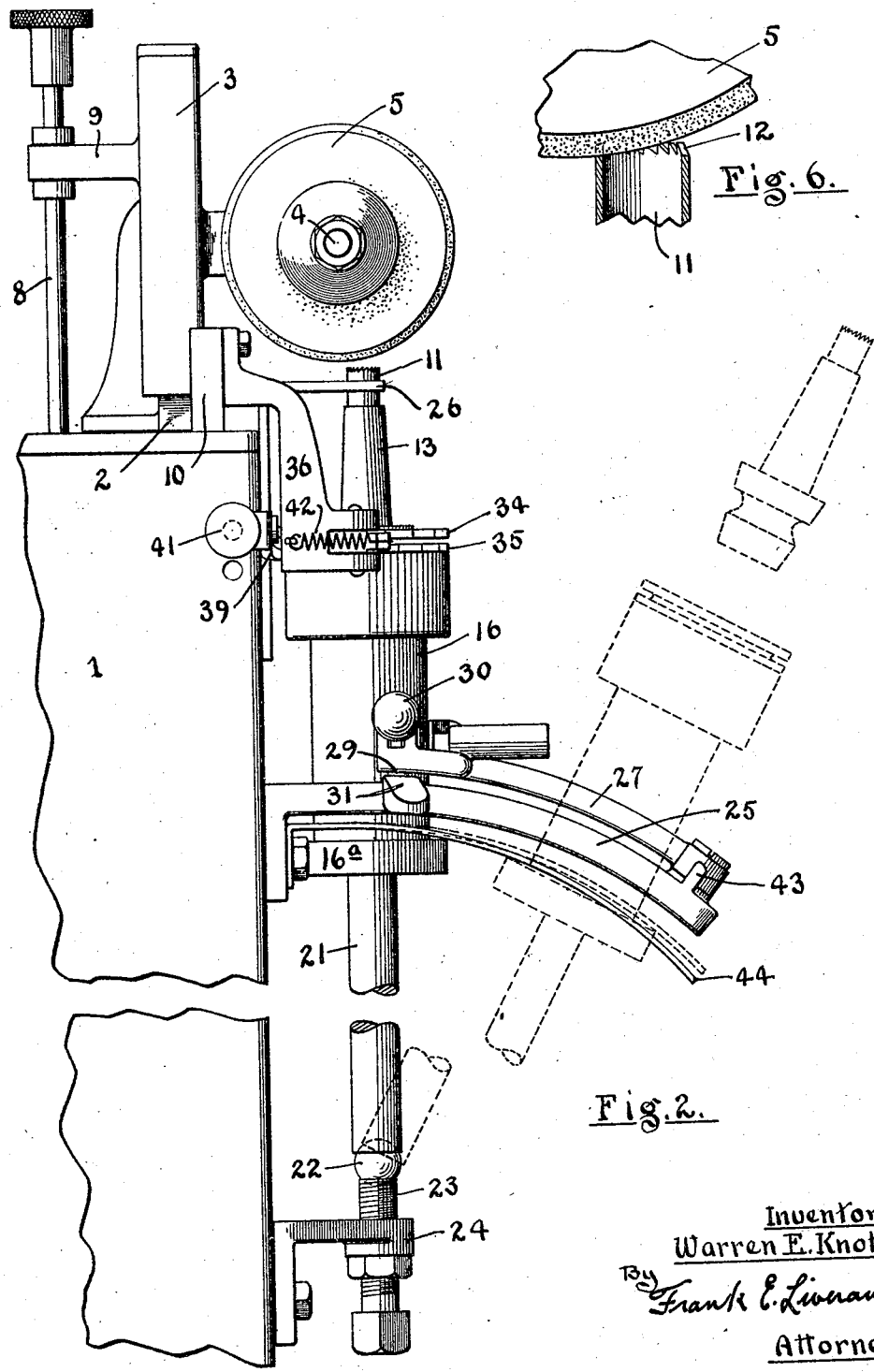
Fig. 2 is a side elevation of the same.
Fig. 6 is an enlarged fragmentary detail of the saw and grinding wheel in operative relation.

The removal of a saw and mandrel from the chuck 16 is accomplished by releasing the latch bolt 29 from the detent 31 and swinging the arm 27 outward thus releasing the chuck 16 and permitting it to swing outward upon its ball support 22. When the arm 27 is swung outward on its pivot it is stopped by engagement with a lug 43 on the forked member 25 where it extends across the opening between the forks and limits the outward movement of the chuck. A flange 16$^a$ is provided at the lower end of the chuck 16 and this flange is engaged by leaf springs 44 located under the forked member 25 which offer a frictional resistance to the movement of the chuck, always retaining the lower end of the shaft 21 in engagement with the pawl 22 and preventing a rapid outward falling movement of the chuck when released. This outward position of the chuck is illustrated by dotted lines in Fig. 2. When in this position the mandrel is removed from the chuck 16 by pulling it outward with sufficient force to overcome the resistance of the retaining balls 17 and a different mandrel and saw are inserted by simply pushing the tapered head of the mandrel into the chuck until it is firmly seated in the tapering opening and the balls engage its annular groove. Slight variations in the size of the tapered heads 14 of the mandrels have no detrimental effect engaging the inwardly inclined surface of the annular groove 15.

In the operation of the machine the mandrel with its saw is inserted as described, into the chuck 16 when the chuck is in outward position, and the chuck is then moved to its operating position being roughly guided in this movement by the forked member 25 sufficiently to cause the saw to enter the V-shaped opening in the saw guide 25 which accurately locates the saw relative to the grinding wheel. When in this position the arm 27 is swung to engage the spring 28 with the chuck 16 and the latch bolt 29 is engaged with the detent 31. Although all of the saws are approximately the same length repeated grinding will vary their length and this variation, if great, may be compensated for by vertical adjustment of the shaft and chuck by the adjusting screw 23. Fine variations are made by adjusting the operating rod 8 which raises or lowers the position of the grinding wheel. The depth of cut is preferably regulated by this latter means. When the saw is in position to be ground the machine is started and the grinding wheel, which is rapidly rotated, engages the saw teeth at the bottom of each vertical reciprocation, the periphery of the grinding wheel being properly shaped to cut the saw teeth at the prescribed angle. The arm 10 is oscillated so that it moves forward toward the grinding wheel when the grinding wheel is in elevated position and during this forward movement the pawl acts upon one of the ratchets 34 and 35 to rotate the chuck and saw the distance of one tooth of the ratchet which corresponds to the distance of one tooth of the saw. It is understood that, prior to starting the grinding operation, the pawl 38 is engaged with the ratchet wheel having teeth corresponding in number with the teeth of the saw in the chuck. After the machine has been properly adjusted and set in operation it automatically continues to grind all of the teeth of the saw one by one as the grinding wheel is reciprocated and the chuck rotated. If the machine is left to continue its operation after the saw has completed one rotation no further grinding will occur as the grinding wheel will merely come down to the position relative to each tooth where it formerly came during the grinding operation.

The machine may be operated in another manner than that above described by permitting it to continue to run while one saw and mandrel is being removed and a new one inserted. When this mode of operation is carried out the head 3 is elevated by means of the adjustment in the operating rod 8 at the end of one operation to raise the grinding wheel away from the saw and the chuck is then swung outward and another saw and mandrel placed in it and moved back to operating position and the grinding wheel lowered by said adjustment, while it is running, into engagement with the saw.

The particular object in locating the axis of the chuck and saw forward of the axis of the grinding wheel is to permit the grinding wheel to engage the teeth on one side of the saw only, the curve of the periphery of the grinding wheel bringing it free from the other side of the saw. Another advantage of this feature of the machine is that the saw teeth are ground with a longer point on their inside than on their outside edges. The advantage of this is in the operation of the saw in cutting the disk. A saw so ground will cut through the material at the periphery of the disk before its outer edge completely passes through the blank piece. This insures a smooth completely cut edge on the disk where otherwise the disk might be cut free from the blank piece leaving splinters on its edge which had not been fully cut off by the saw teeth.

One of the chief advantages of this invention is the accurate location of the saw relative to the grinding wheel. This is accomplished by means of the saw guide 26 closely adjacent the periphery of the grinding wheel and guiding the saw very close to its teeth. By this means inaccuracy of alignment of the saw with the mandrel or of the mandrel with the chuck have no perceptible effect upon the relation of the saw with the grinding wheel. If such mis-alignment is present the saw will be guided accurately relative to the grinding wheel, but the chuck will move eccentrically, such eccentric movement being permitted by the clearance between the chuck and the forked member, the universal mounting of the lower end of the shaft 21 and the yielding action of the spring 28. A further advantage of this type of saw guide is that it will receive and accurately guide any of the different diameters of saws which are to be ground, it being understood that the range of diameters is limited. Of course, a smaller diameter saw will not come in exactly the same position under the grinding wheel that a larger diameter saw will but there is no reason for exactly placing the saws relative to the grinding wheel, it only being necessary that they shall be located forward of the axis of the grinding wheel. The angle of the sides of the saw guide 26 is such all of the saw within the range used will be located relative to the grinding wheel sufficiently close to the proper operating position.

I claim:

1. A saw grinding machine including means for holding a cylindrical saw to turn on its longitudinal axis and a V-shaped guide engaged by the saw.

2. A saw grinding machine comprising a grinding element, means for holding a cylindrical saw to turn on its longitudinal axis, and a V-shaped guide closely adjacent the grinding element and engaged by the saw.

3. A saw grinding machine comprising a grinding wheel and means for holding a cylindrical saw to turn on a longitudinal axis, said axis being offset relative to the axis of the grinding wheel.

4. A saw grinding machine comprising a grinding wheel, means for holding a cylindrical saw to turn on a longitudinal axis, and means engageable with the cylindrical surface of the saw to guide it in position with its axis offset from the axis of the grinding wheel.

5. A saw grinding machine comprising a grinding wheel, means for holding a cylindrical saw for rotation on a longitudinal axis, and a guide engaged by the saw close to the periphery of the grinding wheel to hold the axis of the saw offset from the axis of the grinding wheel.

6. A saw grinding machine comprising a grinding wheel, means for holding a cylindrical saw for rotation on its longitudinal axis, and a V-shaped guide engageable with the saw to hold the saw with its axis offset from the axis of the grinding wheel.

7. A saw grinding machine comprising a grinding wheel, means for holding a cylindrical saw for rotation on its longitudinal axis, and a V-shaped guide located close to the periphery of the grinding wheel to hold the saw with its axis offset from the axis of the grinding wheel.

8. A saw grinding machine comprising a reciprocable grinding wheel, means for holding a cylindrical saw to turn upon its longitudinal axis, and means synchronized with the reciprocation of the grinding wheel for rotating the saw step by step.

9. A saw grinding machine comprising a reciprocable grinding machine, means for holding a cylindrical saw to turn upon its longitudinal axis, means engageable with the cylindrical surface of the saw to guide the saw relative to the grinding wheel, and means synchronized with the reciprocation of the grinding wheel for rotating the saw step by step.

10. A saw grinding machine comprising a reciprocable grinding wheel, means for holding a cylindrical saw to turn upon its longitudinal axis, guide means closely adjacent the periphery of the grinding wheel and engageable with the cylindrical surface of the saw, and means synchronized with the reciprocation of the grinding wheel for rotating the saw step by step.

11. A saw grinding machine comprising a reciprocable grinding wheel, means for holding a cylindrical saw to turn upon its longitudinal axis, a V-shaped guide to locate the saw relative to the grinding wheel, and means synchronized with the reciprocation of the grinding wheel to rotate the saw step by step.

12. A saw grinding machine comprising a reciprocable grinding wheel, means for holding a cylindrical saw to turn upon its longitudinal axis, a V-shaped guide engageable with the saw close to the grinding wheel, and means synchronized with the reciprocation of the grinding wheel to rotate the saw step by step.

13. A saw grinding machine comprising a grinding wheel, means for holding a cylindrical saw, said means being mounted for universal movement, and a guide closely adjacent the grinding wheel and engageable with said saw.

14. A saw grinding machine comprising a grinding wheel, means for holding a cylindrical saw, said means being mounted for universal movement, and a V-shaped guide engageable with the cylindrical surface of the saw.

15. A saw grinding machine including means mounted for universal movement to hold a cylindrical saw, a V-shaped guide, and yieldable means to engage the saw with said V-shaped guide.

16. A saw grinding machine including means for holding a cylindrical saw for rotation on its longitudinal axis, means for imparting step-by-step rotation to the saw, said rotating means being variable relative to the degree of rotation.

17. A saw grinding machine including means for holding a cylindrical saw for rotation on its longitudinal axis, a ratchet wheel on said holding means, and means including a pawl engageable with said ratchet wheel for imparting a step-by-step rotary movement to said holding means and saw.

18. A saw grinding machine including means for holding a cylindrical saw for rotation on its longitudinal axis, a plurality of ratchet wheels on said holding means, means including a pawl engageable with either of said ratchet wheels for imparting a step-by-step rotary motion to said holding means, and means for guiding said pawl to engagement with either of said ratchet wheels.

19. A saw grinding machine including means for holding a cylindrical saw for rotation on its longitudinal axis, a plurality of ratchet wheels on said holding means, a reciprocably mounted pawl, and a movable guide operatively connected with said pawl to guide the pawl into engagement with either of said ratchet wheels.

20. A saw grinding machine comprising a grinding wheel, means for holding a cylindrical saw for rotation on its longitudinal axis, and means for axially adjusting said holding means whereby the saw teeth are adjusted relative to the grinding wheel.

21. A saw grinding machine comprising a grinding wheel, means for holding a cylindrical saw for rotation on its longitudinal axis, said means also mounted for lateral movement, and releasable means for retaining the saw in operative relation to the grinding wheel.

22. A saw grinding machine including a chuck adapted to receive a cylindrical saw mandrel, said chuck being mounted for axial rotation and lateral movement, and means for releasably holding said chuck in saw grinding position.

23. A saw grinding machine including a chuck adapted to releasably receive a cylindrical saw mandrel, said chuck being mounted for axial rotation and lateral movement, a saw guide, and releasable means to hold a saw mounted in said chuck and in engagement with said saw guide.

24. A saw grinding machine including a chuck adapted to releasably receive a cylindrical saw mandrel, said chuck being mounted for axial rotation and lateral movement, a saw guide, and yieldable means to hold a saw mounted in said chuck and in engagement with said saw guide.

25. A saw grinding machine comprising a grinding wheel, a chuck adapted to releasably receive a cylindrical saw mandrel, said chuck being mounted for axial rotation and for lateral movement, a saw guide closely adjacent the grinding wheel, and means for holding the saw in engagement with the saw guide.

26. A saw grinding machine comprising a grinding wheel, a chuck adapted to releasably receive a cylindrical saw mandrel, said chuck being mounted for axial rotation and for lateral movement, and means associated with the chuck for holding the saw in engagement with the saw guide.

27. A saw grinding machine including a chuck to releasably receive a cylindrical saw mandrel, a bearing to support said chuck for rotating and universal swinging movement, and means for axially adjusting said supporting bearing.

28. A saw grinding machine comprising a grinding wheel, a chuck to releasably receive a cylindrical saw mandrel, a universal support for said chuck, a guide to permit swinging movement of said chuck, a saw guide closely adjacent said grinding wheel, and yieldable and releasable means associated with said chuck to hold the saw in engagement with said saw guide.

In testimony whereof I affix my signature.

WARREN E. KNOTT.